C. M. GRIFFIN.
TIRE.
APPLICATION FILED MAR. 31, 1911.
1,072,382.
Patented Sept. 2, 1913.
2 SHEETS—SHEET 1.
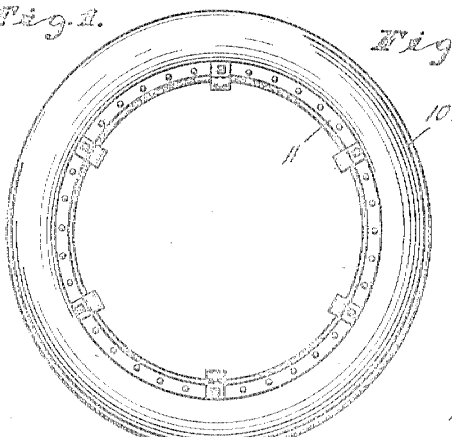
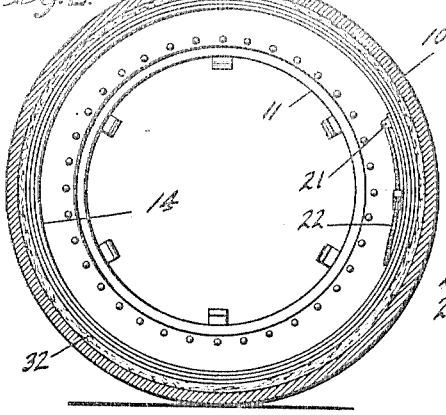
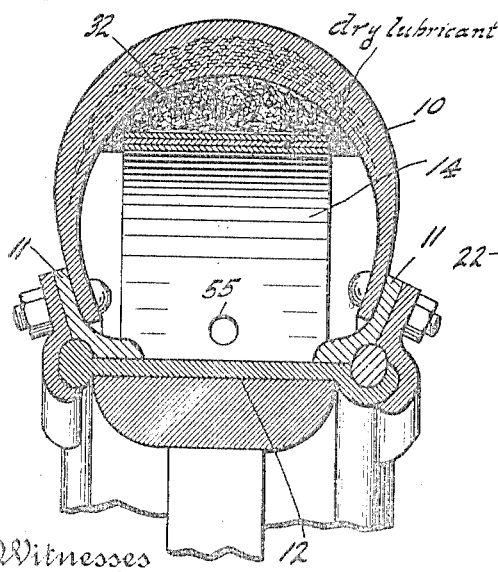
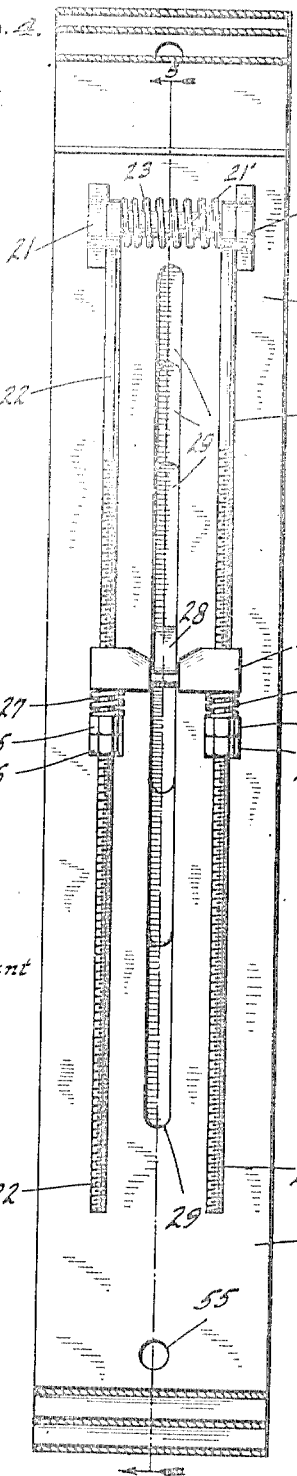
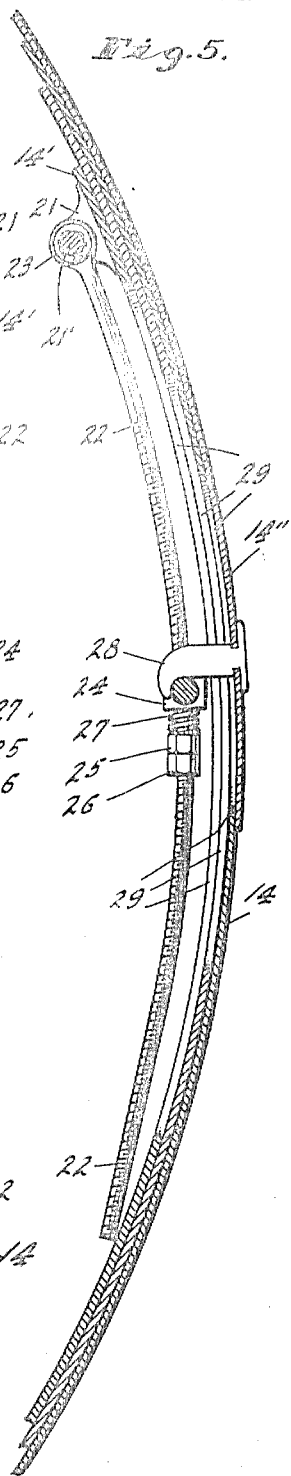
Witnesses
Frank A. Fahle
May Layden
Inventor
Charles M. Griffin,
By Bradford Wood
Attorneys

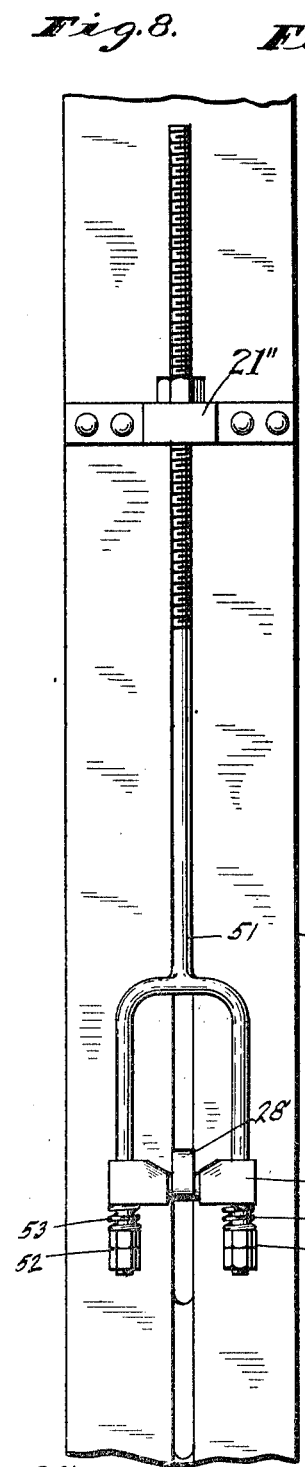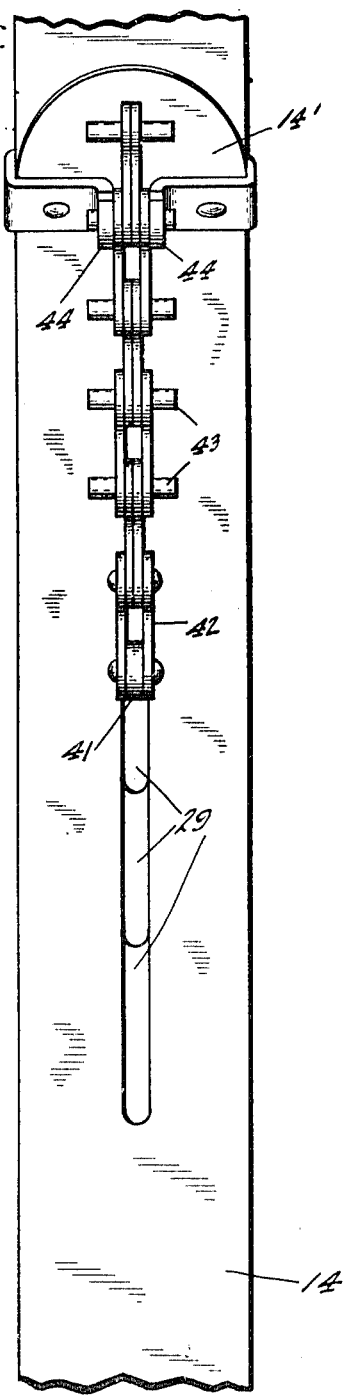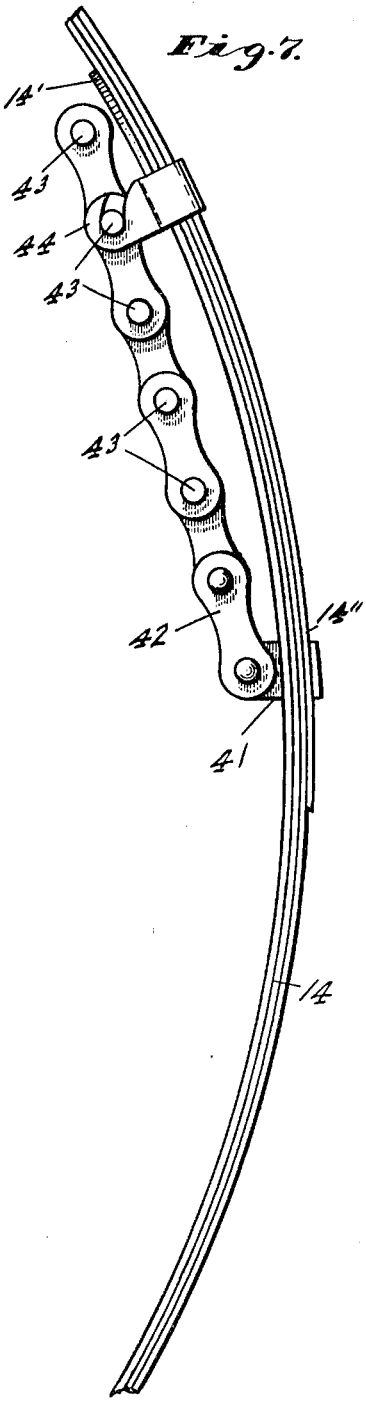

UNITED STATES PATENT OFFICE.

CHARLES M. GRIFFIN, OF INDIANAPOLIS, INDIANA, ASSIGNOR TO CHARLES M. GRIFFIN AND HARRY G. CRAWFORD, A COPARTNERSHIP.

TIRE.

1,072,382.  Specification of Letters Patent.  Patented Sept. 2, 1913.

Application filed March 31, 1911. Serial No. 618,068.

*To all whom it may concern:*

Be it known that I, CHARLES M. GRIFFIN, a citizen of the United States, residing at Indianapolis, in the county of Marion and State of Indiana, have invented a new and useful Tire, of which the following is a specification.

The object of my invention is to produce a tire for vehicle wheels in which the desired resiliency shall be obtained by means of a resilient spiral the ends of which are so connected to each other that provision is made for the necessary relative movement of said ends under action; provision also being made for facilitating the relative movement of the layers of the spiral under action.

The accompanying drawings illustrate my invention.

Figure 1 is a side elevation of a tire constructed in accordance with my invention; Fig. 2 a vertical section transverse to the axis, the resilient spiral being considerably exaggerated in radial dimension; Fig. 3 a transverse section about half size; Fig. 4 a fragmentary plan of the adjacent ends of the spiral showing one desirable form of connection between the adjacent ends of the spiral; Fig. 5 a section on line 5—5 of Fig. 4; Fig. 6 a plan, similar to Fig. 4, showing another means of connecting the adjacent ends of the spiral; Fig. 7 a side elevation of the parts shown in Fig. 6, and Fig. 8 a plan similar to Fig. 4 showing another form of connection.

In the drawings, 10 indicates an inclosing or casing member which may be of any desired material but conveniently in the general form of an ordinary outer casing such as is commonly in use in pneumatic tires.
Firmly secured to the edges of this casing are stiff metal rings 11, 11 which are preferably L-shaped in cross section to insure stiffness. The rings 11 may be suitably formed for connection to the rim 12 of any desired wheel and, as the particular conformation of these rings for fastening purposes will depend upon the shape of wheel rim to which my tire is to be applied, I shall not attempt to describe the same in further detail.

Located within the casing 10 is a metal spiral 14 formed of a comparatively thin resilient band or ribbon wrapped into a spiral. The material from which this ribbon is made may be varied although in prac- tice I have found a fine grade of spring steel to be entirely satisfactory, the ribbon being about 3" wide for a 4" tire and about 3/32" thick. It is to be understood however that the exact dimensions of the ribbon will vary with circumstances. The ribbon is of such length as to make several convolutions and the two ends are then connected together by a yielding means which will permit some relative play of these ends when the device is in use. I consider that it is absolutely essential that the connecting means between the two ends of the spiral have the yielding characteristic which I have just mentioned because, in practice, I found that, when the wheel is subjected to use, the force acting upon the spiral travels around the spiral at all times acting substantially normal to the spiral, and this causes a shifting of the various convolutions upon each other. If the ends of the spiral are left unconnected there is a flabbiness to the spiral which soon causes it to collapse and become too small in diameter to serve as a distending force for the outer casing. If the two ends of the spiral are rigidly connected the spiral becomes too stiff and inelastic and in practice I have found it impossible to make a solid connection between the ends of the spiral of such character as to withstand the great forces resulting from the relative movement of the two ends, and that it is therefore impossible to practically maintain a rigid connection between the two ends of the spiral.

It will be readily understood that many variations of form of connection between the two ends of the spiral may be had which will provide the necessary yielding connection between the said ends while at the same time coming entirely within the spirit of the invention and I have therefore shown in the drawings three different forms of such connection which I believe to be practical.

In Figs. 4 and 5 the inner end 14' of the band or ribbon 14 has secured to its inner face a pair of brackets 21, 21 connected by a pin 21'. On this pin 21' are pivoted two rods 22, 22, the rods being held separated by a spring 23 which surrounds pin 21' and lies between the rods. The rods 22 are threaded for a major portion of their length and passed freely through a block 24. Threaded upon each rod 22 is a suitable nut 25 and check nut 26 and between each nut 25 and the block 24 is a spring 27. Secured to the outer end 14'' of the band 14 is a hook 28 which is projected through suitably formed slots 29, the several slots being made of increasing length to take care of the difference in movement of the various layers. The hook 28 is projected into position to serve as an abutment for block 24 in one direction, the springs 27 holding the parts in place.

In operation the spiral 14 is placed within the casing 10 and the casing is either internally formed to make a seat for the spiral, or an annular seat pad 32 is introduced between the spiral and casing as shown in Fig. 3. Thereupon, by tightening the nuts 25 so as to draw the rods 22 through the block 24, the ends of the spiral may be drawn toward each other in opposite directions so as to increase the diameter of the spiral and thus place the casing 10 under such tension as may be desired between the two rings 11. Whenever the wheel is subjected to a load there will be a distortion of the spiral immediately adjacent the ground which will tend to shift one end of the spiral relative to the other and this shifting is permitted by reason of springs 27.

In the form shown in Figs. 6 and 7 the outer tip 14'' of the ribbon 14 is provided with a pin or standard 41 which is projected through slots 29 in the various layers of the spiral and pivotally connected to the inner end of this standard is a flexible connector which is conveniently formed by a link belt. The forward links of this connector 42 are provided with cross pins 43 any one of which may be placed in a pair of hooks 44 secured to the inner tip 14' of the ribbon 14. With this form there is sufficient flexibility of the connector between the hooks 44 and the pin 41 to permit necessary relative movement of the two ends of the spiral under action.

In the form shown in Fig. 8 the Y-shaped connector 51 has its two arms projected through a block 24', like block 24, and the ends of the arms are provided with nuts 52 with springs 53 between said nuts and the block 24'. The stem of the connector 51 is threaded along its major portion and passes freely through the bracket 21'' which in most particulars corresponds to bracket 21 of the form shown in Fig. 5, a nut being threaded upon the projected end of the stem of the connector. A hook 28' cooperates with the block 24' in the same way as does the hook 28 with the block 24 in the form shown in Fig. 5.

In view of the relative movement of the various convolutions of the spiral, when the device is in action, it is desirable that a lubricant be maintained between the various convolutions and for this purpose I believe that a dry lubricant like flocculent graphite is preferable especially as such a lubricant does not have any deleterious effects upon the outer casing when the outer casing is made of rubber. In order to facilitate the movement of the lubricant between the various convolutions of the spiral I have found it advisable to occasionally perforate the spiral, as indicated at 55.

I claim as my invention:

1. A resilient tire comprising an outer casing, rigid rings secured to the opposite edges of said casing, a resilient spiral comprising two or more complete turns arranged within said casing to expand the same between the rings, and an adjustable circumferentially-yielding connection between the ends of said spiral.

2. A resilient tire comprising an outer casing, rigid rings secured to the opposite edges of said casing, a resilient spiral comprising two or more complete turns arranged within said casing to expand the same between the rings, a member carried by the outer end of said spiral and projected through elongated slots in the adjacent convolutions, and an adjustable circumferentially-yielding connector connecting the inner end of said spiral and said inwardly projecting member.

3. A resilient tire comprising an outer casing, means for firmly holding the edges of said casing, a resilient spiral arranged within said casing to expand the same at its middle, and an adjustable connector between the ends of the spiral by which the spiral may be expanded, said adjustable connector embodying a spring opposing decrease of diameter of the spiral.

In witness whereof, I have hereunto set my hand and seal at Sheboygan, Wisconsin, this 25th day of March, A. D. one thousand nine hundred and eleven.

CHARLES M. GRIFFIN. [L. s.]

Witnesses:
 FELIX BENFEY,
 ALLEN D. YOUNG.